United States Patent
Chin et al.

(10) Patent No.: US 9,727,148 B2
(45) Date of Patent: Aug. 8, 2017

(54) NAVIGATION DEVICE AND IMAGE DISPLAY SYSTEM WITH INERTIAL MODE

(71) Applicant: PIXART IMAGING INC., Hsin-Chu County (TW)

(72) Inventors: Kian-Ming Chin, Penang (MY); Yik-Leong Chong, Penang (MY)

(73) Assignee: PixArt Imaging Inc., Hsin-Chu County (TW)

( * ) Notice: Subject to any disclaimer, the term of this patent is extended or adjusted under 35 U.S.C. 154(b) by 34 days.

(21) Appl. No.: 14/139,981

(22) Filed: Dec. 24, 2013

(65) Prior Publication Data

US 2015/0177857 A1    Jun. 25, 2015

(51) Int. Cl.
*G06F 3/0354* (2013.01)
*G06F 3/03* (2006.01)

(52) U.S. Cl.
CPC ........ *G06F 3/03541* (2013.01); *G06F 3/0317* (2013.01)

(58) Field of Classification Search
CPC .. G06F 3/0354; G06F 3/03543; G06F 3/0383; G06F 2203/0332; G06F 2203/0333; G06F 2203/0334; G06F 3/005
USPC ................................................. 345/163–166
See application file for complete search history.

(56) References Cited

U.S. PATENT DOCUMENTS

| | | | | |
|---|---|---|---|---|
| 5,568,603 | A * | 10/1996 | Chen | G06F 3/0485 715/784 |
| 7,843,430 | B2 * | 11/2010 | Jeng | G01P 15/18 345/156 |
| 2002/0090123 | A1 * | 7/2002 | Bazin | A45D 44/005 382/128 |
| 2008/0070684 | A1 * | 3/2008 | Haigh-Hutchinson | 463/32 |
| 2009/0284532 | A1 * | 11/2009 | Kerr | G06F 3/0481 345/442 |
| 2011/0150363 | A1 * | 6/2011 | Chen | G06F 3/0317 382/291 |
| 2011/0161864 | A1 * | 6/2011 | Nagasaka | G01C 21/367 715/784 |
| 2011/0288805 | A1 * | 11/2011 | Dejnabadi | G01P 7/00 702/96 |

* cited by examiner

*Primary Examiner* — Lisa Landis
(74) *Attorney, Agent, or Firm* — Hauptman Ham, LLP (57) ABSTRACT

There is provided an image display system including a navigation device and an inertial unit. The navigation device outputs displacements at a report rate. The inertial unit may provide an inertial displacement for continuously controlling a cursor motion after the displacements decrease to zero.

19 Claims, 5 Drawing Sheets

NAVIGATION DEVICE AND IMAGE DISPLAY SYSTEM WITH INERTIAL MODE

BACKGROUND

1. Field of the Disclosure

This disclosure generally relates to an interactive image system and, more particularly, to a navigation device and an image display system using the same.

2. Description of the Related Art

As the manufacturing technology of the large size display panel becomes mature, the commercially available display system gradually employs a large size display panel as the image display equipment, such as the screen operating in cooperation with a tablet computer or a portable electronic device. In this manner, it is able to show more contents within a single screen so as to improve the efficiency and to increase the size of contents shown on the screen so as to decrease the fatigue of the user.

An optical mouse is generally used by a user to control a cursor to move to a desired position on the screen and to click on a specific icon by single clicking or double clicking of the left or right mouse key so as to execute specific functions or applications. However, with the gradually increased screen size, when the user moves the cursor on a large size screen, the distance of the optical mouse to be moved on a table surface is relatively increased. Generally speaking, the table surface has limited space for operating the optical mouse such that if the user has to move the cursor through a long distance, the cursor may not be able to be moved to the desired position directly by moving the optical mouse. In some conditions, the user may have to move the optical mouse through a short distance and then lift up and put the optical mouse back to the start point and then move the optical mouse toward the same direction again so as to be able to move the cursor to the desired position. Not only it is inconvenient in use, but also the user fatigues easily in long-term usage.

Accordingly, the present disclosure provides a navigation device and the image display device using the same suitable for the cursor control on a large size screen, wherein the cursor may be moved through a long distance by only moving the navigation device by a short distance thereby improving the user experience.

SUMMARY

The present disclosure provides a navigation device and an image display system using the same, wherein in the inertial mode when the navigation device detects an inertial condition is satisfied, the cursor is continuously controlled to have the inertial drift so as to decrease the accumulated moving distance of the navigation device.

The present disclosure further provides a navigation device and an image display system using the same, wherein in the multi-cursor mode a plurality of sub-cursors are generated around a cursor moving synchronously to the cursor and used to click on the icon so as to decrease the accumulated moving distance of the navigation device.

The present disclosure provides a navigation device including an image sensor, a processing unit, an output interface and an inertial unit. The image sensor is configured to successively capture image frames of a work surface. The processing unit is configured to calculate displacements of the navigation device with respect to the work surface according to the image frames. The output interface is configured to output the displacements at a report rate. The inertial unit is configured to analyze a plurality of displacements within a predetermined period and provide an inertial displacement for being outputted by the output interface when at least one of the displacements within the predetermined period is larger than a threshold and the displacements decrease to zero within the predetermined period.

The present disclosure further provides an image display system including an image display device and a navigation device. The image display device includes a screen and a host. The screen may display a cursor. The host is configured to control images displayed by the screen. The navigation device includes an image sensor, a processing unit, an output interface and a multi-cursor switch. The image sensor is configured to successively capture image frames of a work surface. The processing unit is configured to calculate displacements of the navigation device with respect to the work surface according to the image frames. The output interface is configured to output the displacements to the host at a report rate to allow the host to control the cursor according to the displacements. The multi-cursor switch is configured to generate a control signal for controlling the host to display a plurality of sub-cursors around the cursor and separated by a predetermined pixel distance.

The present disclosure further provides an image display system including a navigation device and an image display device. The navigation device outputs displacements at a report rate. The image display device includes a screen and a host. The screen may display a cursor. The host includes an inertial unit configured to analyze a plurality of displacements received from the navigation device within a predetermined period, and is configured to control the cursor with an inertial displacement when at least one of the displacements within the predetermined period is larger than a threshold and the displacements decrease to zero within the predetermined period.

In one aspect, the inertial displacement may be determined according to a maximum displacement or an average displacement of the displacements within the predetermined period. And a moving direction of the inertial displacement may be determined according to a direction of the maximum displacement or average displacement of the displacements within the predetermined period.

In one aspect, the inertial unit may decrease the inertial displacement with a decreasing ratio once every inertial period, and the decreasing ratio may be selected from a user graphic interface, set previously or determined according to a size of the screen.

In one aspect, the inertial unit may decrease the inertial displacement with a decreasing ratio once every inertial period or maintain identical inertial displacement. When the processing unit detects a click signal, a roller signal, a nonzero displacement, a sense signal of a capacitive touch device or a sense signal of an optical finger navigation during inertial drifting of the cursor, the inertial unit stops providing the inertial displacement immediately.

In one aspect, the host may control one of the sub-cursors to display with different feature to be served as a main control sub-cursor, and the navigation device may further include at least one control button or a roller configured to select the main control sub-cursor between the sub-cursors.

In one aspect, the cursor and the sub-cursors may move synchronously according to the displacement or the inertial displacement.

In the navigation device and the image display system according to the embodiment of the present disclosure, the user may select to enter an inertial mode or a multi-cursor mode through a triggering device, e.g. an inertial switch or a multi-cursor switch. In this manner, when the user operates a cursor on a large size screen, he/she can easily move the cursor through a long distance so as to reduce the fatigue caused by long term usage and increase the user experience.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The image display system according to the embodiment of the present disclosure may include an inertial mode and/or a multi-cursor mode for reducing the accumulated displacement of the navigation device operated by a user, wherein both the inertial mode and the multi-cursor mode may be entered by triggering an enable switch, wherein the enable switch may be a mechanical button/switch or an electric button/switch. In the inertial mode, when the displacement or displacement per second (i.e. velocity) of the navigation device is larger than or equal to a threshold and then decreases to zero, a cursor on the screen may continuously perform the so called inertial drift with an inertial displacement till the inertial displacement is decreased to 0, the cursor reaches the screen edge or a drift stop signal is generated (described later). In the multi-cursor mode, a plurality of sub-cursors may be displayed around a cursor and separated by a predetermined pixel distance such that the user may use one of the sub-cursors to execute the functions that can be executed by the cursor conventionally, e.g. clicking on an icon. In this manner, the user needs not to move the navigation device through a long distance in order to move the cursor on a large size screen.

Figure 1:
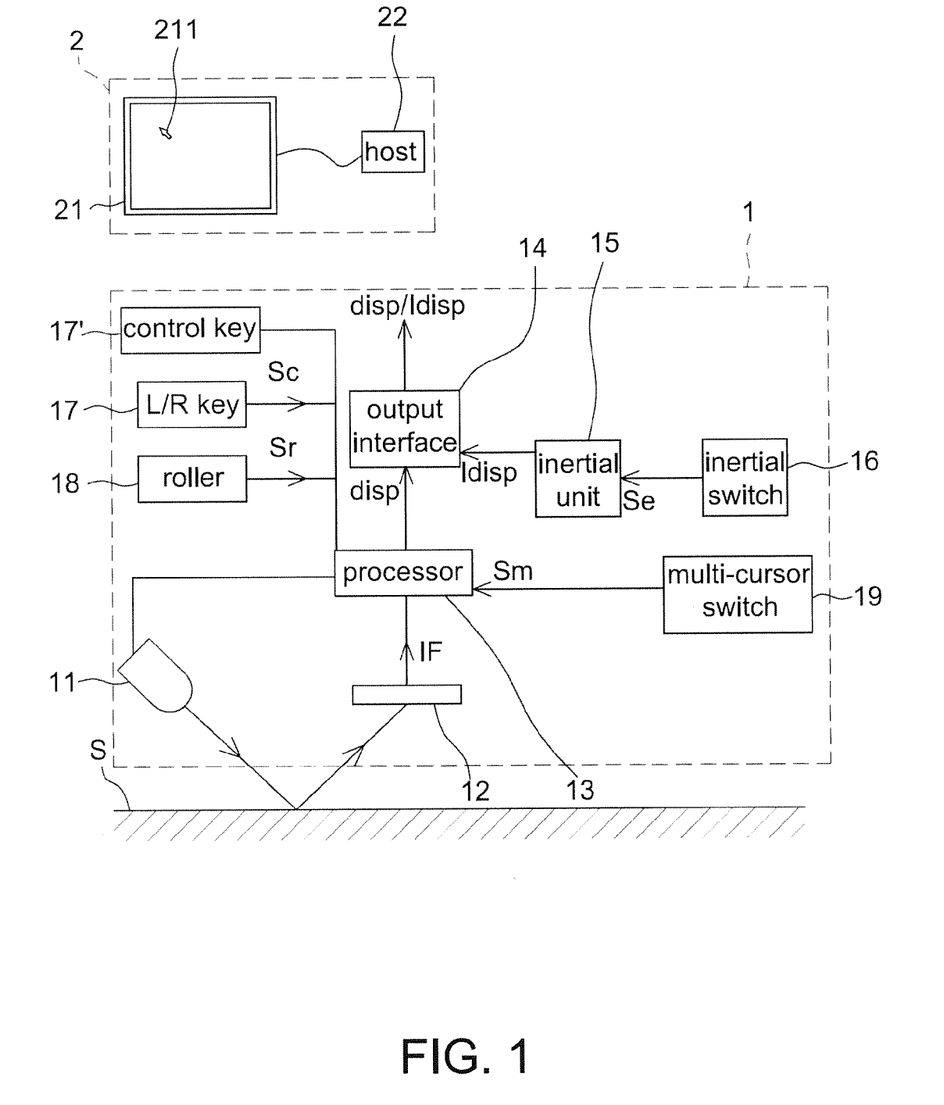
FIG. 1 shows a schematic block diagram of the image display system according to an embodiment of the present disclosure.

Referring to FIG. 1, it shows a schematic block diagram of the image display system according to an embodiment of the present disclosure. The image display system of this embodiment includes a navigation device 1 and an image display device 2. The navigation device 1 is for being operated on a work surface S by a user (not shown), e.g. an optical mouse. The navigation device 1 is configured to successively calculate displacements with respect to the work surface S, e.g. calculating displacements according to the correlation between images, but not limited to. The navigation device 1 outputs the displacements at a report rate to the image display device 2 so as to perform the corresponding control, e.g. controlling the cursor movement or executing the predetermined applications. In one embodiment, the report rate may be determined according to a current program being run by the image display device 2, e.g. the report rate may be higher when a game program is being run and the report rate may be lower when an office program is being run.

The navigation device 1 includes a light source 11, an image sensor 12, a processing unit 13, an output interface 14, an inertial unit 15, an inertial switch 16, at least one button 17 and a roller 18, wherein when the inertial unit 15 is enabled by the inertial switch 16, an inertial mode is entered. In other words, the navigation device 1 of this embodiment may be operated in a normal mode or an inertial mode depending on whether the inertial unit 15 is enabled or not. When the inertial unit 15 is not enabled, the navigation device 1 does not perform the inertial drift. In addition, the navigation device 1 may further include a lens (or lens set) or light guiding element(s) for increasing the emission efficiency of the light source 11 and the sensing efficiency of the image sensor 12.

The light source 11 may be a light emitting diode or a laser diode and is configured to emit light of identifiable spectrum, e.g. invisible light, to illuminate the work surface S.

The image sensor 12 may be a CMOS image sensor, a CCD image sensor or other image sensing devices adapted to convert optical energy to electrical signals. The image sensor 12 may capture the reflected light from the work surface S at a fixed or variable sampling frequency and output image frames IF.

The processing unit 13 may be a digital signal processor or other processors adapted to process image data. The processing unit 13 is coupled to the image sensor 12 and configured to calculate the displacement or velocity of the navigation device 1 with respect to the work surface S according to the image frames IF from the image sensor 13.

The output interface 14 may be a wired or wireless transmission interface and configured to transmit the displacement disp calculated by the processing unit 13 to the host 22 of the image display device 2 at a report rate, wherein wired and wireless transmission technologies are well known and thus details thereof are not described herein. In addition, the processing unit 13 may calculate the displacement using the conventional method without particular limitation. The present disclosure is to allow the output interface 14 to output the inertial displacement Idisp to the host 22 when entering the inertial mode and an inertial condition is satisfied (described later) such that the host 22 may control the cursor 211 to perform the inertial drift. It is appreciated that the host 22 may include a receiving interface adapted to communicate with the output interface 14.

Figure 3:
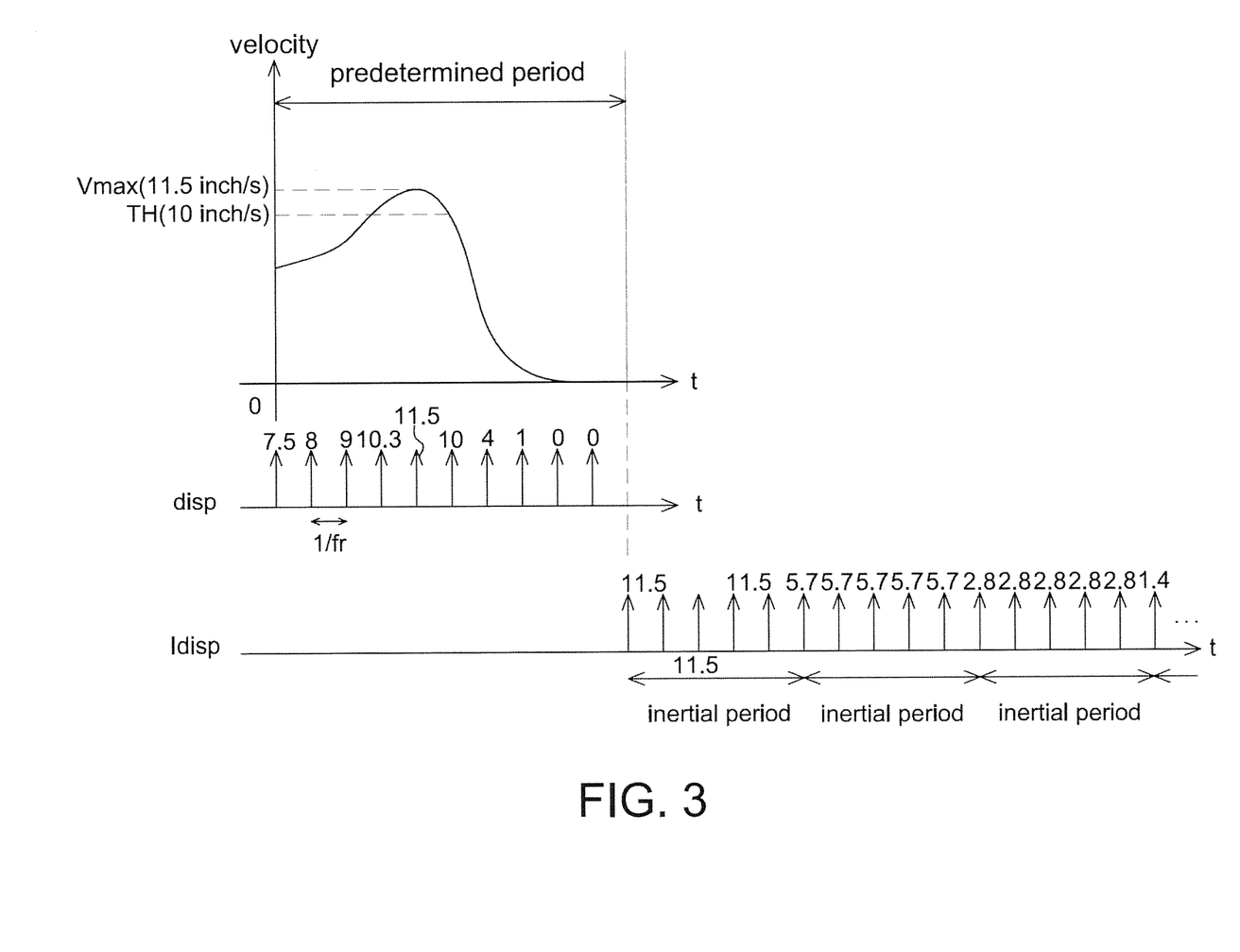
FIG. 3 shows an operational schematic diagram of the inertial mode of the image display system according to the embodiment of the present disclosure.

The inertial unit 15 is configured to analyze a plurality of displacements disp within a predetermined period, and to provide an inertial displacement Idisp for being outputted by the output interface 14 when at least one of the displacements within the predetermined period is larger than or equal to a threshold and the displacements disp decrease to 0 within the predetermined period. For example referring to FIG. 3, it shows an operational schematic diagram of the inertial mode of the image display system according to the embodiment of the present disclosure, i.e. the inertial mode is entered when the inertial switch 16 is triggered. In the inertial mode, the inertial unit 15 analyzes 10 displacements (i.e. the predetermined period) latest obtained by the processing unit 13 and a threshold TH is assumed to be 10 inch/s, wherein FIG. 3 shows that the report rate is fr and thus a time interval between two displacements is 1/fr. When at least one displacement disp within the predetermined period is larger than or equal to the threshold TH, e.g. the maximum displacement 11.5 inch/s herein, and the displacements at the final part of the predetermined period decrease to 0, the inertial unit 15 provides an inertial displacement Idisp for being outputted by the output interface 14 to the image display device 2. In one embodiment, the inertial displacement Idisp may be a maximum displacement, an average displacement or a ratio of the maximum or average displacement of the displacements within the predetermined period. And a moving direction of the inertial displacement may be determined according to a direction of the maximum displacement or average displacement of the displacements obtained within the predetermined period. For example, FIG. 3 shows that after the predetermined period, the output interface 14 outputs, also at the report rate (but not limited to), the maximum displacement V=11.5 inch/s within the predetermined period, and every inertial period (e.g. 5/fr herein) the inertial displacement Idisp is decreased according to a decreasing ratio, e.g. the inertial displacement Idisp is decreased as Idisp/2 once every inertial period 5/fr herein, wherein the decreasing ratio may be selected by a user graphic interface or set previously and not limited to those disclosed herein.

It should be mentioned that the length of the predetermined period, the displacement variation within the predetermined period, the length of the inertial period, the threshold and the decreasing ratio shown herein are only intended to describe but not to limit the present disclosure. It should be mentioned that although FIG. 1 shows that the inertial unit 15 is separated from the processing unit 13 and the output interface 14, the present disclosure is not limited thereto. In other embodiments, the inertial unit 15 may be integrated in the processing unit 13 or the output interface 14 and is not limited to that shown in FIG. 1; i.e. the processing unit 13, the output interface 14 and the inertial unit 15 may be integrated in a same chip. In addition, the number of 0 displacement included in the last part of the predetermined period may be different according to different applications, and the inertial unit 15 is not necessary to output the inertial displacement Idisp immediately when a 0 displacement within the predetermined period is detected.

The inertial unit 15 is activated by the inertial switch 16. For example the inertial switch 16 may be a mechanical switch/button or an electric switch/button. When a user triggers the inertial switch 16, it may generate an enable signal Se to the inertial unit 15 so as to enter an inertial mode. In the inertial mode, the inertial unit 15 may continuously analyze the displacements obtained by the processing unit 13 so as to identify whether an inertial condition (as shown in FIG. 3) is satisfied or not. For example in the application of the optical mouse, the inertial switch 16 may be the additional switch/button independent from the mouse left and right keys. In addition, when the inertial switch 16 is not triggered, the navigation device 1 operates in the normal mode; i.e. the output interface 14 only outputs the displacement disp obtained by the processing unit 13, and when the processing unit 13 obtains 0 displacement, the output interface 14 outputs 0 displacement.

Figure 5A:
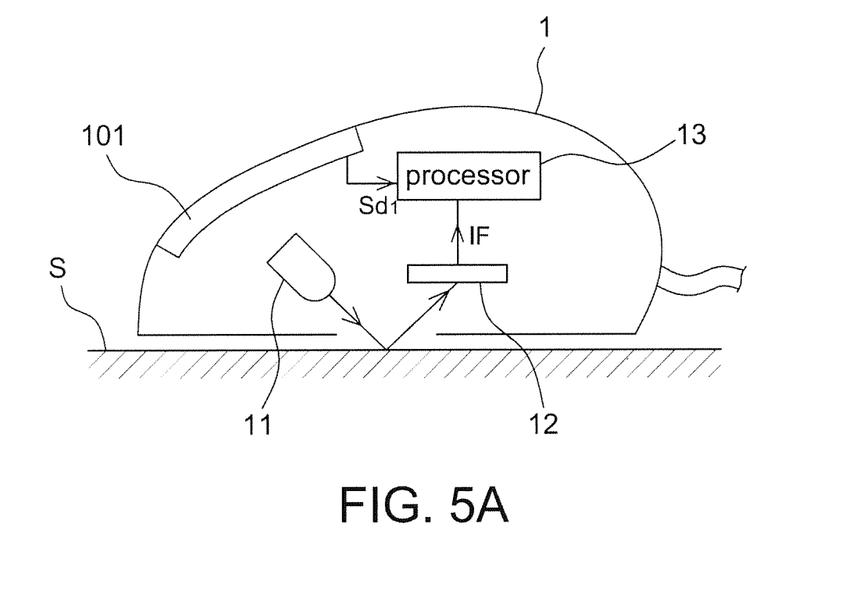
FIGS. 5A and 5B show schematic diagrams of the navigation device according to the embodiment of the present disclosure.
Figure 5B:
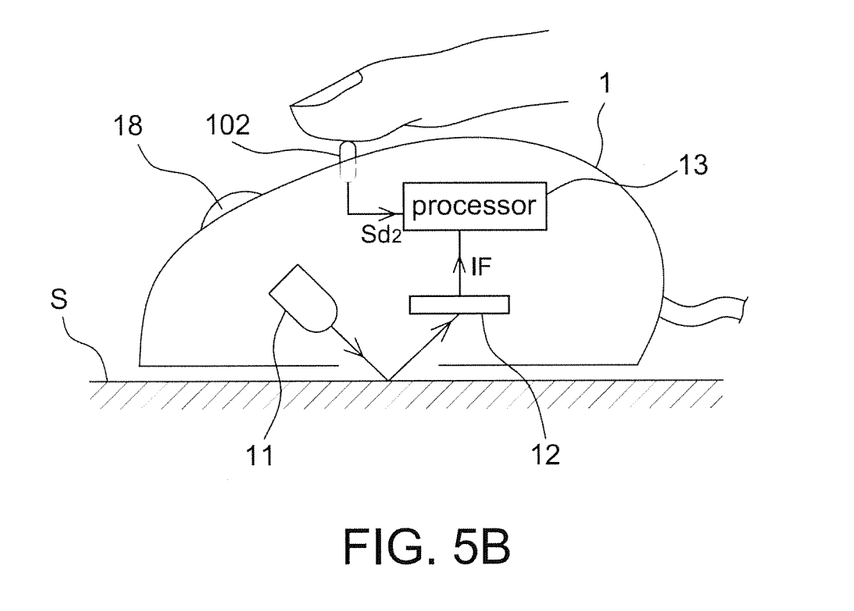

In addition, in the inertial mode, every time the inertial condition is satisfied, i.e. at least one of the displacements disp within a predetermined period is larger than or equal to a threshold and the displacements disp decrease to 0 within the predetermined period, the output interface 14 outputs the inertial displacement Idisp till the inertial displacement Idisp is decreased to 0 or the navigation device 1 occurs any detecting event, e.g. when the processing unit 13 detects a click signal Sc, a roller signal Sr, a nonzero displacement, a sense signal of a capacitive touch device or a sense signal of an optical finger navigation during inertial drifting of the cursor, the output interface 14 stops outputting the inertial displacement Idisp immediately, wherein the click signal Sc may be generated when any button 17 of the navigation device 1 is pressed; the roller signal Sr may be generated when the roller 18 of the navigation device 1 is operated; the displacement may be a new nonzero displacement calculated by the processing unit 13 induced by a user moving the navigation device; the sense signal $S_{d1}$ may be generated when a capacitive touch device 101 (as shown in FIG. 5A) detects an object; and the sense signal $S_{d2}$ may be generated when an optical finger navigation 102 (as shown in FIG. 5B) detects an object. In other words, the navigation device 1 of the present disclosure may be integrated with a capacitive touch device 101 or an optical finger navigation 102. More specifically speaking, during the output interface 14 outputting the inertial displacement, the navigation device 1 does not detect any event or displacement.

In another embodiment, the inertial condition may be set as a time interval between at least one displacement which is larger than or equal to the threshold TH and at least one 0 displacement being smaller than a predetermined period, wherein the predetermined period of this embodiment may be equal to or different from that of FIG. 3.

The image display device 2 includes a screen 21 and a host 22. The screen 21 may be a liquid crystal display, a plasma display or a projection device without particular limitation. In the interactive control, the screen 21 may display a cursor for being controlled by a user. The host 22 may be integrated with the screen 21 or physically separated from the screen 21 (as shown in FIG. 1), and configured to control images displayed by the screen 21 according to a currently executed application, e.g. controlling the motion of the cursor 211 according to the displacement disp or the inertial displacement Idisp from the navigation device 1, but not limited to.

Figure 4:
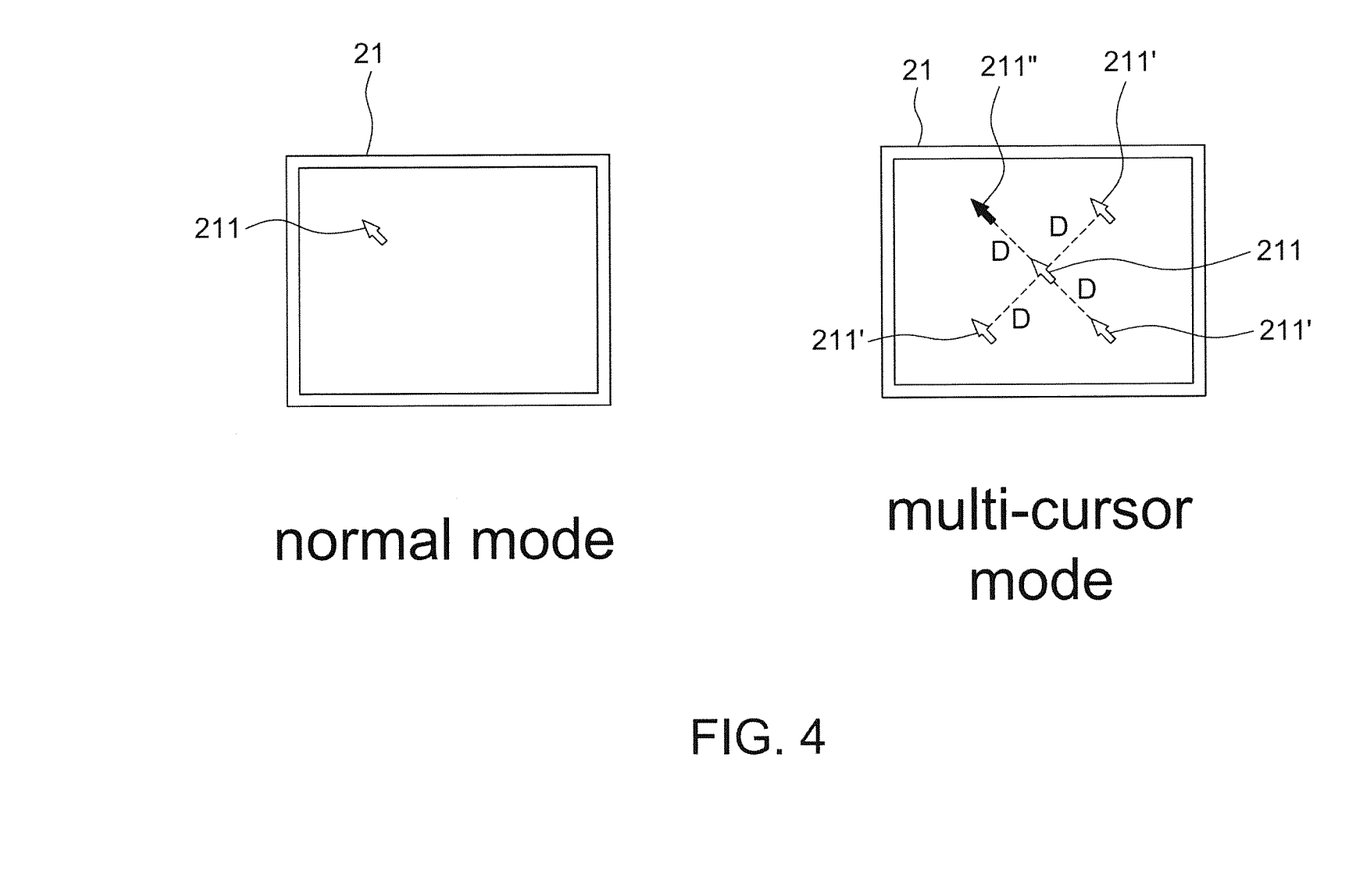
FIG. 4 shows an operational schematic diagram of the multi-cursor mode of the image display system according to the embodiment of the present disclosure.

Referring to FIG. 1 again, the navigation device 1 of this embodiment may further include a multi-cursor switch 19 and a control button 17' configured to enter a multi-cursor mode and change a main control sub-cursor (described later) respectively. For example in the application of the optical mouse, the multi-cursor switch 19 may be the additional mechanical or electronic button/switch independent from the left and right mouse keys. When being triggered by the user, the multi-cursor switch 19 may generate a control signal Sm to the processing unit 13. The processing unit 13 then transmits a multi-cursor mode signal (including information of the control signal Sm) through the output interface 14 to the host 22 so as to control the host 22 to display a plurality of sub-cursors 211' and 211" around the cursor 211 and separated by a predetermined pixel distance D as shown in FIG. 4. In one embodiment, the predetermined pixel distance D may be selected from a user graphic interface, set previously or determined according to a size of the screen 2. For example, when the screen 2 is larger, the predetermined pixel distance D may be larger; whereas when the screen 2 is smaller, the predetermined pixel distance D may be smaller. It should be mentioned that a number of the sub-cursors displayed around the cursor 211 is not limited to that shown in FIG. 4 and may be determined according to difference applications or selected from a user graphic interface. Preferably, the sub-cursors 211' and 211" are displayed around the cursor 211 symmetrically.

When the multi-cursor switch 19 is triggered and the multi-cursor mode is entered, the host 22 synchronously moves the cursor 211 and the sub-cursors 211' and 211" according to the displacement disp from the navigation device 1; that is, the sub-cursors 211' and 211" always locate around the cursor 211 and separated by the predetermined pixel distance D. In addition, the host 22 may further control one of the sub-cursors, e.g. the sub-cursor 211", to display with different feature to be served as a main-control sub-cursor, e.g. flicking, different brightness, different color and different size, but not limited to. The navigation device 1 may further select the main control sub-cursor 211" between the sub-cursors 211' through at least one additional control button 17' or the roller 18. For example, when the control button 17' is pressed or the roller 18 is operated, the main control sub-cursor 211" may sequentially change in the clockwise or counter clockwise direction. In this manner, when one of the sub-cursors 211' is moved onto an icon to be selected, it is able to change the sub-cursor 211' on the icon to become the main control sub-cursor 211" and then perform the click operation. Accordingly, the user needs not to move the navigation device 1 through a long distance on the work surface S. In one embodiment, when the main control sub-cursor 211" activate an application, the sub-cursors 211' and 211" may not be displayed until a next trigger of the multi-cursor switch 19. Or the sub-cursors 211' and 211" may be displayed continuously till the multi-cursor switch 19 is triggered again.

In addition, in the embodiment of the present disclosure, the inertial mode and the multi-cursor mode may be performed simultaneously. For example, when the multi-cursor switch 19 is triggered, the host 22 displays a plurality of sub-cursors 211' and 211" around the cursor 211 and separated by a predetermined pixel distance D. Then when the inertial unit 15 is activated by the inertial switch 16 to enter the inertial mode and the aforementioned inertial condition is satisfied, the inertial unit 15 provides an inertial displacement Idisp (as shown in FIG. 3) for being outputted by the output interface 14 to the host 22, and the host 22 may synchronously move the cursor 211 and the sub-cursors 211' and 211" according to the inertial displacement Idisp. In addition, the operation of the inertial mode under the multi-cursor mode is similar to that of the inertial mode being performed lonely as described above and thus details thereof are not repeated herein.

Figure 2:
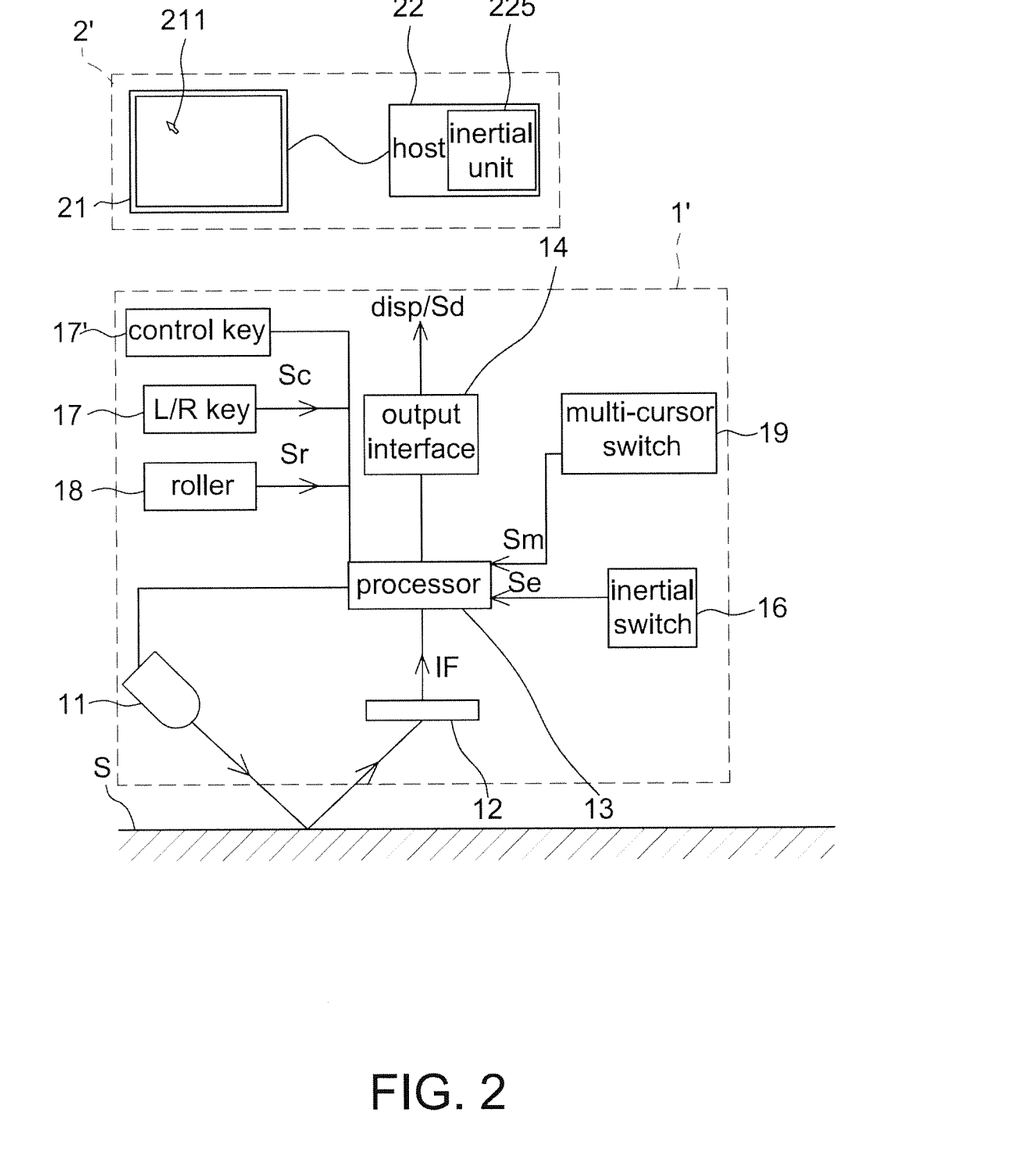
FIG. 2 shows a schematic block diagram of the image display system according to another embodiment of the present disclosure.

Referring to FIG. 2, is shows a schematic block diagram of the image display system according to another embodiment of the present disclosure, which also includes a navigation device 1' and an image display device 2'. The difference between this embodiment and FIG. 1 is that in this embodiment an inertial unit 255 is disposed in the host 22 rather than in the navigation device 1' and others are similar to FIG. 1. In other words, the inertial unit according to the embodiment of the present disclosure may be implemented in the navigation device 1 (e.g. by hardware or software) or in the image display device 2' (e.g. by hardware or software).

Therefore in the embodiment of FIG. 2, the output interface 14 of the navigation device 1' only outputs the displacement disp calculated by the processing unit 13 but does not output the inertial displacement Idisp. When the inertial switch 16 is triggered by the user, the inertial switch 16 generates an enable signal Se to the processing unit 13 which accordingly controls the output interface 14 to output an inertial mode signal (including information of the enable signal Se) to the host 22 so as to enable the inertial unit 225.

After entering the inertial mode, the inertial unit 225 continuously analyzes a plurality of displacements disp received from the navigation device 1' within a predetermined period. When at least one of the displacements disp is larger than or equal to a threshold and the displacements decrease to 0 within the predetermined period (as shown in FIG. 3), an inertial condition is satisfied and the host 22 continuously controls the cursor 211 with an inertial displacement.

In this embodiment, the host 22 may also decrease the inertial displacement according to a decreasing ratio (as shown in FIG. 3), and the decreasing ratio may be selected from a user graphic interface, set previously or determined according to a size of the screen 21. In this embodiment, the host 2' is aware of the size of the screen 21 through the communication therebetween. For example, when the screen size is larger, the decreasing ratio is smaller so that the cursor 211 may inertially drift for a longer distance; on the contrary, when the screen size is smaller, the decreasing ratio is larger so that the cursor 211 may inertially drift for a shorter distance.

In addition, during the host 22 controlling the cursor 21 with the inertial displacement, the inertial drift may be ended by few ways: (1) the inertial displacement is decreased to 0 or smaller than a lower limit threshold by the decreasing ratio; (2) when the cursor 211 reaches an edge of the screen 21; or (3) when detecting a click signal Sc, a roller signal Sr, a nonzero displacement, a sense signal $S_{d1}$ of a capacitive touch device 101 or a sense signal $S_{d2}$ of an optical finger navigation, the navigation device 1' sends a disable signal Sd to the host 22 for disabling the inertial unit 225, wherein the generating of the signals above has been described in the embodiment of FIG. 1 and thus details thereof are not repeated herein. When at least one of the above there conditions is satisfied, the host 22 stops controlling the cursor 211 with the inertial displacement immediately such that the cursor 211 stops drifting immediately, and the host 22 restarts to detect whether the inertial condition is satisfied or not.

In addition, in this embodiment, the inertial mode and the multi-cursor mode may also be performed simultaneously, and the implementation thereof is similar to that of FIG. 1 and thus details thereof are not repeated herein. The image display system of this embodiment may also perform the normal mode or the inertial mode depending on whether the inertial switch 16 is triggered or not. In the normal mode the host 22 may only control the cursor 211 according to the displacement disp sent from the navigation device 1; in the inertial mode when the inertial condition is satisfied, the host 22 may control the cursor 211 with the inertial displacement.

In another embodiment, when the navigation device 1 includes a capacitive touch device 101 or an optical finger navigation 102; in the inertial mode the processing unit 13 may take the displacement calculated according to the image frames IF captured by the image sensor 12 as the normal mode control and the inertial unit 15 may provide the inertial displacement to the cursor 211 for the inertial drifting according to the displacement signal detected by the capacitive touch device 101 or optical finger navigation 102 (e.g. the inertial condition shown in FIG. 3 being used), or vice versa. And when the processing unit 13 detects a click signal Sc and/or a roller signal Sr, the inertial drift of the cursor 211 is immediately stopped. In other words, in the embodiment of the present disclosure the inertial unit 15 may provide the inertial displacement to correspondingly control the motion of the cursor 211 according to the displacement information detected by different displacement detection devices, wherein said displacement detection devices are not limited to those disclosed in the present disclosure.

It should be mentioned that the displacement mentioned above is displacement per second. In other embodiments, the displacement may also be the displacement obtained between two image frames IF.

As mentioned above, the conventional optical mouse has to be moved by a larger accumulated distance in order to operate the cursor on a large size screen, and thus has the problem of inconvenient in operation and having a larger burden to the user. Therefore, the present disclosure further provides a navigation device and an image display system using the same (FIGS. 1 and 2) that may reduce the accumulated moving distance of the navigation device by entering an inertial mode and/or a multi-cursor mode thereby increasing the user experience.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A navigation device, configured to be placed on a work surface in operation, the navigation device comprising:
   an image sensor configured to successively capture light reflected from the work surface to output image frames;
   a processing unit configured to calculate displacements of the navigation device with respect to the work surface according to the image frames;
   an output interface configured to output the displacements at a report rate; and
   an inertial unit configured to
      analyze a plurality of calculated displacements within a predetermined period and an inertial period which is subsequent to the predetermined period, and
      provide an inertial displacement in the inertial period to control a cursor within the inertial period during which the calculated displacement is zero when at least one of the calculated displacements within the predetermined period is larger than a threshold and the calculated displacements decrease to zero within the predetermined period and maintain zero to the inertial period,
   wherein
      the cursor, within the predetermined period, is controlled by the displacements calculated by the processing unit without being controlled by the inertial displacement provided by the inertial unit.

2. The navigation device as claimed in claim 1, further comprising an inertial switch configured to generate an enable signal to enable the inertial unit.

3. The navigation device as claimed in claim 1, wherein the inertial displacement configured to control the cursor within the inertial period during which the calculated displacement is zero is a maximum displacement or an average displacement of the displacements calculated within the predetermined period.

4. The navigation device as claimed in claim 1, wherein the inertial unit is configured to decrease the inertial displacement once every the inertial period.

5. The navigation device as claimed in claim 4, wherein the inertial unit is configured to decrease the inertial displacement with a decreasing ratio, and the decreasing ratio is selected from a user graphic interface or set previously.

6. The navigation device as claimed in claim 1, wherein during the output interface outputting the inertial displacement, the output interface stops outputting the inertial displacement when the processing unit detects a click signal, a roller signal, a nonzero displacement, a sense signal of a capacitive touch device or a sense signal of an optical finger navigation.

7. An image display system, comprising:
   an image display device, comprising:
      a screen displaying a cursor; and
      a host configured to control images displayed by the screen; and
   a navigation device configured to be placed on a work surface in operation, the navigation device comprising:
      an image sensor configured to successively capture light reflected from the work surface to output image frames;
      a processing unit configured to calculate displacements of the navigation device with respect to the work surface according to the image frames;
      an output interface configured to output the displacements to the host at a report rate to allow the host to control a cursor according to the calculated displacements;
      an inertial unit configured to
         analyze a plurality of calculated displacements within a predetermined period and an inertial period which is subsequent to the predetermined period, and
         provide an inertial displacement in the inertial period to control the cursor within the inertial period during which the calculated displacement is zero when at least one of the calculated displacements within the predetermined period is larger than a threshold and the calculated displacements decrease to zero within the predetermined period and maintain zero to the inertial period, wherein the cursor, within the predetermined period, is controlled by the displacements calculated by the processing unit without being controlled by the inertial displacement provided by the inertial unit; and
      a multi-cursor switch configured to generate a control signal for controlling the host to display a plurality of sub-cursors around the cursor and separated by a predetermined pixel distance.

8. The image display system as claimed in claim 7, wherein the predetermined pixel distance is selected from a user graphic interface, set previously or determined according to a size of the screen.

9. The image display system as claimed in claim 7, wherein the host is configured to control one of the sub-cursors to display with different feature to be served as a main control sub-cursor.

10. The image display system as claimed in claim 9, wherein the navigation device further comprises at least one control button or a roller configured to select the main control sub-cursor between the sub-cursors.

11. The image display system as claimed in claim 7, wherein the cursor and the sub-cursors are configured to move synchronously according to the calculated displacement.

12. The image display system as claimed in claim 7, wherein the cursor and the sub-cursors are configured to move synchronously according to the inertial displacement.

13. An image display system, comprising:
   a navigation device configured to be placed on a work surface in operation, calculate displacements with respect to the work surface according to light reflected from the work surface and output the displacements at a report rate; and an image display device, comprising:
a screen displaying a cursor; and
a host comprising an inertial unit configured to analyze a plurality of displacements received from the navigation device within a predetermined period and an inertial period which is subsequent to the predetermined period, and the host being configured to control a cursor with an inertial displacement in an inertial period during which the displacement received from the navigation device is zero when at least one of the received displacements within the predetermined period is larger than a threshold and the received displacements decrease to zero within the predetermined period and maintain zero to the inertial period, wherein the cursor, within the predetermined period, is controlled by the displacements received by the navigation device without being controlled by the inertial displacement provided by the inertial unit.

14. The image display system as claimed in claim 13, wherein the host is configured to decrease the inertial displacement once every the inertial period.

15. The image display system as claimed in claim 14, wherein the host is configured to decrease the inertial displacement with a decreasing ratio, and the decreasing ratio is selected from a user graphic interface, set previously or determined according to a size of the screen.

16. The image display system as claimed in claim 13, wherein when the cursor reaches an edge of the screen, the host stops controlling the cursor with the inertial displacement.

17. The image display system as claimed in claim 13, wherein the navigation device comprises an inertial switch configured to generate an enable signal to the host for enabling the inertial unit.

18. The image display system as claimed in claim 13, wherein the inertial displacement configured to control the cursor within the inertial period during which the displacement received from the navigation device is zero is a maximum displacement or an average displacement of the displacements received within the predetermined period.

19. The image display system as claimed in claim 13, wherein during the host controlling the cursor with the inertial displacement, the navigation unit outputs a disable signal to the host for disabling the inertial unit when detecting a click signal, a roller signal, a nonzero displacement, a sense signal of a capacitive touch device or a sense signal of an optical finger navigation.

* * * * *